United States Patent
Bauduin et al.

(10) Patent No.: US 11,047,480 B2
(45) Date of Patent: Jun. 29, 2021

(54) CONTACTLESS LABYRINTH SEAL OBTAINED BY ADDITIVE MANUFACTURING

(71) Applicant: Safran Transmission Systems, Colombes (FR)

(72) Inventors: Lionel Bauduin, Houilles (FR); Julien Viel, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 6 days.

(21) Appl. No.: 16/092,241

(22) PCT Filed: Apr. 12, 2017

(86) PCT No.: PCT/FR2017/050878
§ 371 (c)(1),
(2) Date: Oct. 9, 2018

(87) PCT Pub. No.: WO2017/178758
PCT Pub. Date: Oct. 19, 2017

(65) Prior Publication Data
US 2019/0162313 A1 May 30, 2019

(30) Foreign Application Priority Data

Apr. 15, 2016 (FR) ...................... 16 53342

(51) Int. Cl.
*F16J 15/447* (2006.01)
*F16J 15/40* (2006.01)

(52) U.S. Cl.
CPC ......... *F16J 15/4472* (2013.01); *F16J 15/406* (2013.01)

(58) Field of Classification Search
CPC ....... F16J 15/4472; F16J 15/447; F16J 15/406
See application file for complete search history.

(56) References Cited

U.S. PATENT DOCUMENTS

| 835,836 | A | * | 11/1906 | Schulz | ................. | F16J 15/4472 |
| | | | | | | 277/419 |
| 1,626,237 | A | * | 4/1927 | Hodgkinson | ........ | F16J 15/4472 |
| | | | | | | 277/413 |

(Continued)

FOREIGN PATENT DOCUMENTS

| EP | 1734292 A1 | 12/2006 |
| EP | 3130827 A1 | 2/2017 |

(Continued)

OTHER PUBLICATIONS

Search Report issued in French Patent Application No. 1653342 dated Nov. 21, 2016.

(Continued)

*Primary Examiner* — Eugene G Byrd
(74) *Attorney, Agent, or Firm* — Pearne & Gordon LLP

(57) ABSTRACT

A contactless seal intended for being fitted in a wall and a shaft passing through an opening of the wall, the seal comprising a rotary member intended for being supported by the shaft and a stationary member intended for being supported by the opening, the stationary member being inserted around the rotary member while being rotatably movable relative to same, the rotary member having an outer surface provided with at least one circumferential rib and the stationary member having an inner surface provided with at least one groove, or vice-versa. Each rib is partially inserted into a corresponding groove in order to form a labyrinthine leak path. The rotary member and the stationary member are each made up of a single part, and the rotary member and/or the stationary member are obtained by additive manufacturing.

5 Claims, 2 Drawing Sheets

(56) References Cited

U.S. PATENT DOCUMENTS

| | | | | |
|---|---|---|---|---|
| 1,689,735 A | * | 10/1928 | Losel | F16J 15/4472 |
| | | | | 277/419 |
| 3,477,385 A | * | 11/1969 | Williams | F16J 15/4472 |
| | | | | 415/112 |
| 3,630,529 A | * | 12/1971 | Ball | F04D 7/065 |
| | | | | 277/419 |
| 4,383,720 A | | 5/1983 | Ernst | |
| 4,428,587 A | | 1/1984 | Forch | |
| 5,676,472 A | * | 10/1997 | Solomon | B25J 19/0075 |
| | | | | 277/347 |
| 6,843,482 B1 | * | 1/2005 | Bayne | F16J 15/002 |
| | | | | 277/412 |
| 9,136,151 B2 | * | 9/2015 | Van Der Blij | H01L 21/67126 |
| 2004/0119238 A1 | * | 6/2004 | Skumawitz | F16J 15/4472 |
| | | | | 277/412 |
| 2006/0237914 A1 | * | 10/2006 | Li | F16J 15/445 |
| | | | | 277/415 |
| 2007/0262122 A1 | * | 11/2007 | Clark | B23K 9/162 |
| | | | | 228/101 |
| 2010/0276892 A1 | * | 11/2010 | Sanchez | F16J 15/4472 |
| | | | | 277/419 |
| 2011/0006485 A1 | | 1/2011 | Nakagawa | |
| 2011/0182719 A1 | * | 7/2011 | Deo | F01D 11/02 |
| | | | | 415/173.1 |
| 2011/0272893 A1 | * | 11/2011 | Raible | F01D 11/02 |
| | | | | 277/419 |
| 2011/0280715 A1 | * | 11/2011 | Garg | F01D 11/001 |
| | | | | 415/174.5 |
| 2012/0027582 A1 | * | 2/2012 | Natarajan | F01D 11/025 |
| | | | | 415/229 |
| 2012/0043728 A1 | * | 2/2012 | Zeng | F01D 11/001 |
| | | | | 277/412 |
| 2012/0091662 A1 | * | 4/2012 | Neeli | F01D 11/02 |
| | | | | 277/420 |
| 2014/0191476 A1 | * | 7/2014 | Bricaud | F01D 11/02 |
| | | | | 277/412 |
| 2015/0001807 A1 | | 1/2015 | Cho | |
| 2015/0086343 A1 | | 3/2015 | Rizzo et al. | |
| 2017/0045145 A1 | | 2/2017 | Williamson et al. | |
| 2018/0017101 A1 | | 1/2018 | Bauduin et al. | |
| 2018/0094698 A1 | | 4/2018 | Bauduin et al. | |
| 2018/0283558 A1 | * | 10/2018 | Peterson | F16J 15/4476 |

FOREIGN PATENT DOCUMENTS

| | | | | |
|---|---|---|---|---|
| FR | 2137540 | A1 | | 12/1972 |
| FR | 2873183 | A1 | | 1/2006 |
| GB | 2123498 | A | | 2/1984 |
| JP | 02245581 | A | * | 10/1990 ... F16J 15/4472 |

OTHER PUBLICATIONS

International Search Report issued in Application No. PCT/FR2017/050878 dated Jun. 22, 2017.

Written Opinion issued in Application No. PCT/FR2017/050878 dated Jun. 22, 2017.

Application document as-filed for patent application entitled: Self-Contained Reduction Gear With Two Ratios, and System With Engine and Reversible Electrical Machine Including This Reduction Gear, U.S. Appl. No. 15/771,444, filed Apr. 27, 2018.

* cited by examiner

CONTACTLESS LABYRINTH SEAL OBTAINED BY ADDITIVE MANUFACTURING

This is the National Stage application of PCT international application PCT/FR2017/050878, filed on Apr. 12, 2017 entitled "CONTACTLESS LABYRINTH SEAL OBTAINED BY ADDITIVE MANUFACTURING", which claims the priority of French Patent Application No. 16 53342 filed Apr. 15, 2016, both of which are incorporated herein by reference in their entirety.

TECHNICAL FIELD

The invention relates to a seal ensuring sealing between a rotating part passing through a fixed part, like in particular a rotating shaft passing through an opening of a casing wall.

PRIOR ART

Such a seal enables to achieve, for example, sealing between the inner space of a power transmission casing such as a mechanical reduction gear or a gearbox and the outside environment, at the output shaft which passes through the wall of this casing and which rotates with respect to it.

Such a seal is expected to prevent the escape of a mixture of air and lubricant from the inner space of the casing towards the outside environment, since the pressure in the casing can be greater than the outside pressure.

The seals which are commonly implemented in mechanical power transmission applications, like for example, accessory gear boxes, equipping aircraft engines, comprising contact seals, lip seals and contactless seals.

Contact seals comprise a mobile member comprising a disc and carried by the shaft, as well as a fixed member carried by the casing and comprising a friction element held and supported on the disc by a spring to ensure sealing. Lip seals themselves comprise mainly an elastomer ring held in contact on the shaft.

These seals general have a lifespan that is too short, due to the fact that the friction elements that they comprise, are subjected to increased slipping speeds without lubrication, which in the end leads to the deterioration thereof.

Thus, the cost of these seals is high, whereas their lifespan is insufficient. In practice, the deterioration of seals is one of the main causes of failure on aircraft power transmissions.

Seals called debonding seals, sometimes called contactless seals, themselves lead to friction only during start and stop phases. When functioning, in other words, when the shaft rotates at a nominal speed, there is no friction surface: a small space separates the rotating member carried by the shaft from the fixed member carried by the opening and which surrounds this rotating member. The friction which occurs at the start however contributes to causing real wear.

There are also contactless seals called labyrinth seals or air seals, with which there is no direct contact between the rotating member and the fixed member, including in stop and start phase, these two parts being continuously separated by a small space. This small space constituting an escape route for the fluid, it is designed to have a labyrinth shape so as to offer a significant resistance to the passage of air. However, it is often necessary to provide an inflow of air to compensate this leak. Another solution consists of choosing very small gaps to limit the leak in question, but this can lead to wear of the seal, resulting from mechanical deformations putting the fixed member and the mobile member in contact since they are thus situated at a very small distance.

In practice, contactless seals are complex mechanical elements of which the integration in an existing casing is problematic, and the sealing that they provide can prove to be insufficient.

DESCRIPTION OF THE INVENTION

To this end, the invention aims for a contactless seal for a rotating shaft passing through an opening of a wall, this seal comprising a rotating member intended to be carried by the shaft and a fixed member intended to be carried by the opening of the wall, the rotating member being slotted into the fixed member, while being mobile in rotation with respect to it, the rotating member having an outer face provided with at least one circumferential ridge and the fixed member having an inner face provided with at least one recess or vice versa, each ridge being partially engaged in a corresponding recess, such that the inner face of the fixed member and the outer face of the rotating member jointly delimit a labyrinthine leak route, characterised in that the rotating member and the fixed member are each formed from one single part, and in that the rotating member and/or the fixed member is obtained by additive manufacturing.

With this solution, the fixed member and the rotating member can each be formed from one single part by being rigidly connected to one another and mobile in rotation against one another, and by being slightly spaced from one another such that the labyrinthine escape route has the smallest as possible passage cross-section.

The escape route can further have a complex shape to increase the resistance opposite the passage of air, which enables to extend the counteracting surfaces and therefore the risks of wear by contact or by circulation of impurities while benefiting an acceptable escape ratio.

The invention also relates to a seal thus defined, wherein the rotating member comprises, at one of the ends thereof, a ventilation element tending to introduce fluid into one of the ends of the labyrinthine leak route to reduce a pressure difference between the ends of this labyrinthine escape route to reduce a pressure gap between the ends of this labyrinthine leak route.

The invention also relates to a seal thus defined, wherein the ventilation element is a centrifugal member comprising fins extending parallel to the axis of rotation of the rotating member, and being carried by an end face of this rotating member.

The invention also relates to a seal thus defined, wherein the fixed member comprises an edge situated in regard to the fins of the ventilation element to channel the ventilated air towards the labyrinthine escape route.

The invention also relates to a seal thus defined, comprising at one of the ends of the rotating member, a deoiling element.

The invention also relates to a seal thus defined, wherein the deoiling element comprises a series of radial strips to centrifuge the oil drops developing in the proximity thereof.

The invention also relates to a seal thus defined, wherein the deoiling element comprises a metal foam at its perimeter to centrifuge oil drops developing in the proximity thereof.

The invention also relates to an aircraft engine equipped with an accessory power transmission comprising a contactless seal according to one of the preceding claims.

DETAILED DESCRIPTION OF SPECIFIC EMBODIMENTS

Figure 1:
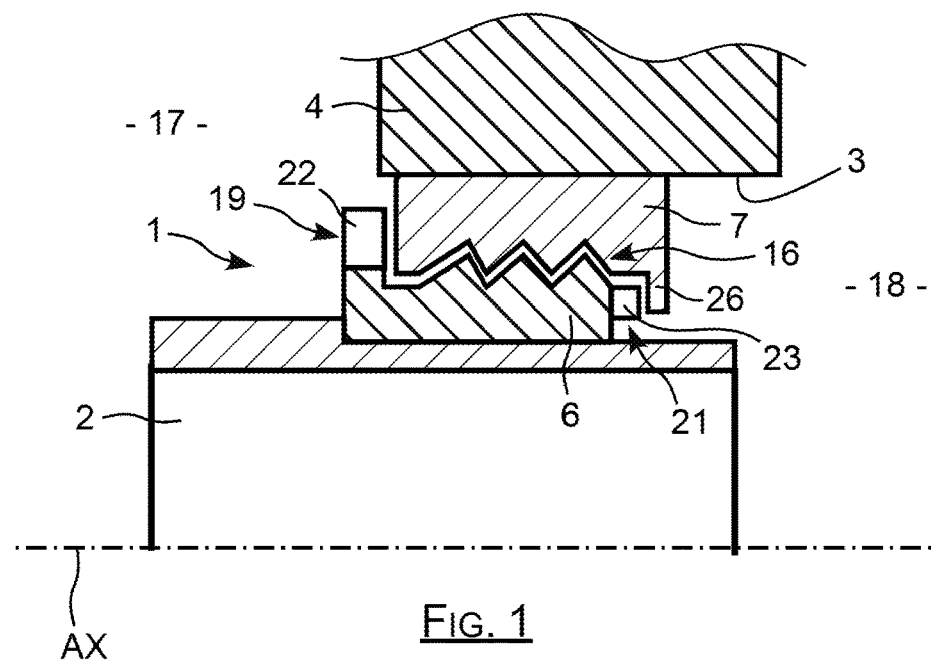
FIG. 1 is a cross-sectional view showing the seal according to the invention equipping a rotating shaft and an opening of a wall passed through by this shaft.

In the example in FIG. 1, the seal according to the invention referenced with 1 is mounted on a shaft 2 rotating around an axis AX and passing through an opening 3 of a wall 4 of a casing. It comprises a rotating member 6 having a shape of revolution and surrounding the shaft 2 by being rigidly connected to it, and a fixed member 7 which surrounds the rotating member and is rigidly connected to the wall 4.

Figure 2:
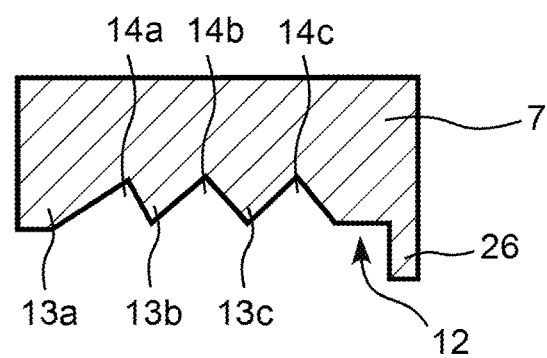
FIG. 2 is a cross-sectional view showing the fixed member of the seal according to the invention represented by itself.
Figure 3:
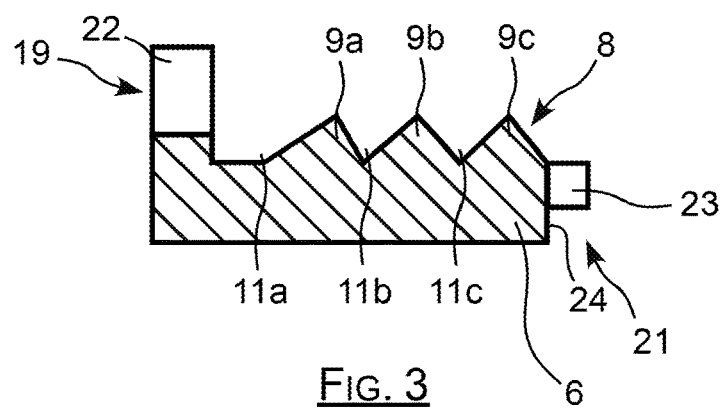
FIG. 3 is a cross-sectional view showing the rotating member of the seal according to the invention represented by itself.

As can be seen in FIG. 3, the rotating member 6 has a general shape of revolution, comprising an outer face 8 provided with an alternation of ridges 9a, 9b and 9c and of recesses 11a, 11b and 11c, circumferential, delimiting three elevations on the outer face thereof. In the same way, in FIG. 2, the fixed member 7 which surrounds the rotating member comprises an inner face 12 here forming three elevations. These elevations are constituted by an alternation of ridges 13a, 13b and 13c and recesses 14a, 14b and 14c that can be seen, in particular, in FIG. 3.

The alternation of ridges and recesses of the rotating member 6 and that of the fixed member 7 are complementary: the ridges 9a-9c of the rotating member 6 are engaged respectively in the slots 14a-14c of the fixed member 7. Similarly, the ridges 13a-13c of the fixed member 7 are engaged in the slots 11a-11c of the rotating member.

As can be seen in FIG. 1, the fixed member 7 surrounds the rotating member 6 by being slotted around it by their alternations of ridges and of slots, but without the outer face 8 of the rotating member 6 contacting the inner face 12 of the fixed member 7, a sufficient radial gap being provided between these surfaces.

The radial space, corresponding to the radial gap, which is situated between the outer face 8 and the inner face 12, and which extends circumferentially along the rotating member 6 and along the fixed member 7 thus constitutes a leak route, referenced with 16, and by which the inner space 17 of the casing and the outside environment 18 are connected.

The leak route 16 has a labyrinth shape, thanks to the alternations of ridges and recesses of the rotating member and of the fixed member, such that this route introduces a significant head loss which opposes the passage of air or fluid from the inner space 17 to the outside environment 18, so as to constitute a barrier between these two spaces.

As arises from the figures, the fixed member is slotted circumferentially around the rotating member and cannot be disconnected from it. To this end, the fixed member can be obtained by additive manufacturing, directly around the rotating member, this enables to construct the fixed member directly around the rotating member manufactured beforehand. This fixed member is thus directly constructed with its ridges and recesses slotted into the corresponding ridges and recesses of the rotating member. Another possibility can consist of jointly manufacturing the rotating member and the fixed member by additive manufacturing in one same manufacturing operation to obtain these two parts slotted around one another and having a sufficient radial gap.

In this context, additive manufacturing can be ensured, for example, with the method named by the trademark CLAD (Construction Laser Additive Directe—Direct Additive Laser Manufacturing). This method consists of using equipment comprising a device generating a laser beam to melt one or more metal powders provided by a deposit nozzle, so as to successively constitute layers of deposit of a metal material.

Generally, other additive manufacturing methods can be used, like the EBM (Electron Beam Melting) method, or the SLM (Selective Laser Melting) method.

The powders melted by the laser thus constitute a homogenous and dense deposit on the surface or layer which carries them, which is itself also melted during the process.

The radial gap which is provided between the outer face of the rotating member and the inner face of the fixed member ensures that when functioning, in other words, when the rotating member rotates in the fixed member, this rotation occurs without contact and without friction, and through this, even without wear.

Thanks the use of additive manufacturing to form the rotating member and/or the fixed member, on the one hand, the radial gap between these elements can be decreased and, on the other hand, the number of ridges and of recesses can be increased, and the geometry thereof can be made more complex, which enables to significantly increase the level of sealing which is offered by the seal, without contact. In other words, the fluid flow circulating in the escape route is extremely small, thanks to a greater number of ridges and of recesses and/or a smaller radial gap.

But, the effectiveness of the barrier constituted by the labyrinthine leak route 16 related to the passage of fluid and/or of oil from the inner space to the outside environment 18 can be even more increased by providing, on the one hand, a deoiling element 19 and, on the other hand, a ventilation element 21.

The deoiling element 19 is situated at the inlet of the leak route 16, in other words, on the side of the inner space 17, to limit the intake of oil in this route, whereas the ventilation element 21 is situated at the outlet of the route 16 and extends to produce, in this route 16, a reverse circulation of air to oppose the outing of air or fluid coming from the inner space 17.

Figure 5:
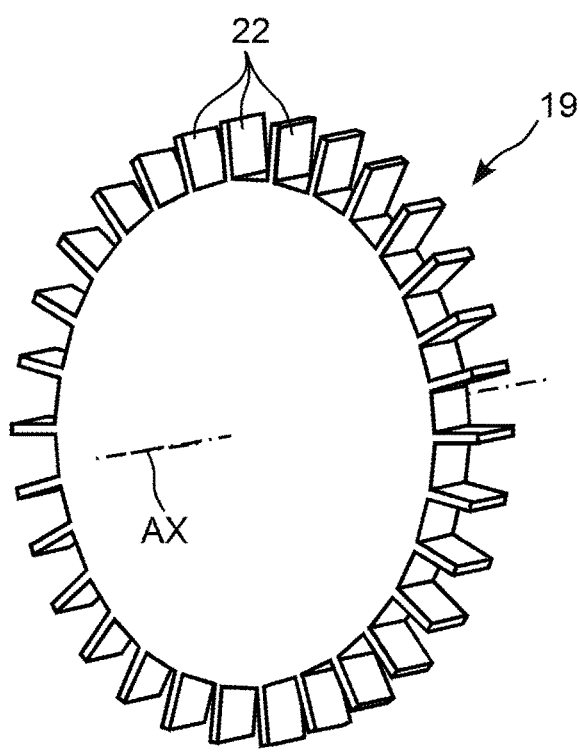
FIG. 5 is a perspective view of a deoiling element of the seal according to the invention.

As can be seen in FIG. 5, the deoiling element 19 has here a wheel shape, equipped with blades or radial strips 22 regularly spaced from one another at the periphery thereof. This element 19 is situated at the end of the rotating member 6 of which it forms an integral part, and the strips 22 thereof are situated opposite the inlet of the route 16. Under these conditions, oil drops developing in the proximity of the inlet of the route 16 are centrifuged by the strips 22 as soon as they approach this inlet, such that in practice, they cannot thus enter into this escape route 16.

Figure 4:
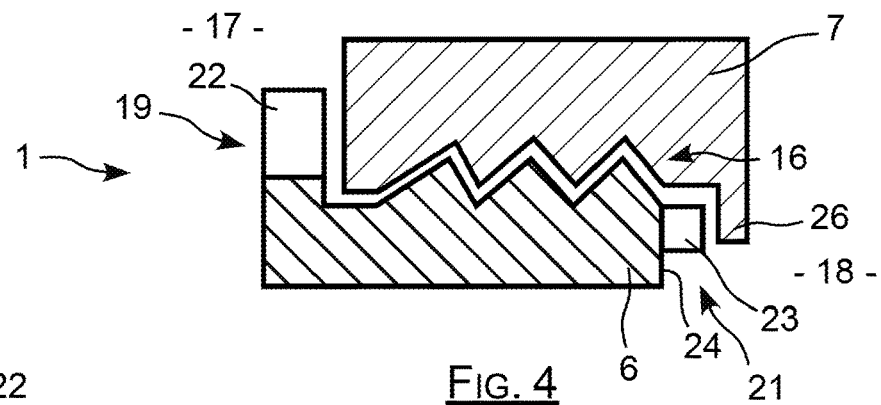
FIG. 4 is a cross-sectional view of the seal according to the invention represented by itself.

As can be seen in FIG. 4, each strip has the base thereof situated radially, substantially at mid-height of the ridges 9a-9c of the rotating member, and the top thereof situated radially beyond the tops of the ridges 9a-9c. These strips are moreover situated along the axis AX at the level of the inlet of the route 16, so as to further delimit a type of additional chicane for this leak route 16. The different strips 22 are regularly spaced from one another around the axis AX, each strip having a rectangular plate shape, oriented in a radial orientation, parallel to the axis AX.

Instead of the wheel 19, it is also possible to use a metal foam carried by the rotating member 6, to, similarly, centrifuge the oil drops standing in the proximity of the inlet of this route 16.

As indicated above, the seal according to the invention also comprises a ventilation element which is situated at the outlet of the leak route 16, so as to counteract the pressure gap due to the fact that the pressure in the inner space 17 is generally greater than the pressure of the surrounding environment 18.

This ventilation element tends also continually to intake air through the outlet of the leak route 16 so as to oppose an air flow which would extend to pass through the route from the inner space 17 to the surrounding environment 18.

Figure 6:
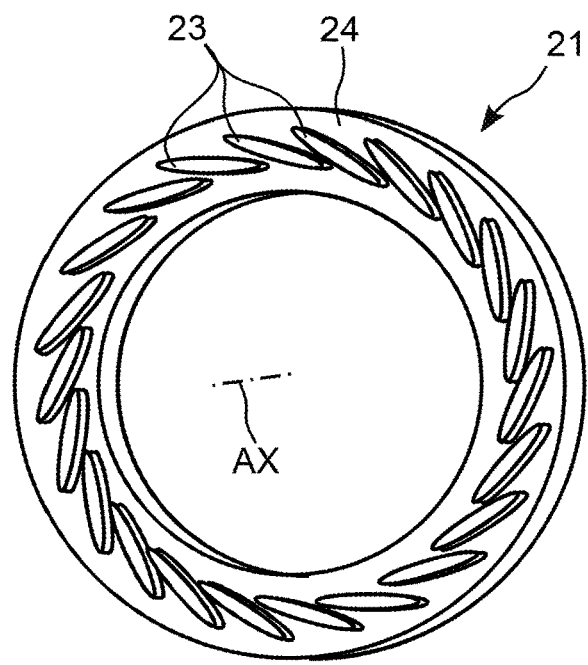
FIG. 6 is a perspective view of a ventilation element of the seal according to the invention.

This ventilation element 21 which is represented more clearly in FIG. 6, ensures here a centrifugal ventilation, in other words, tending to produce a radial air flow extending from the axis of rotation to enter into the leak route 16 through the outlet thereof.

As can be seen in FIG. 6, this element 21 comprises fins 23 carried by an end face 24 of the rotating member 6, this end face being generally flat and of normal orientation to the axis AX. These fins 23 are regularly spaced from one another around the axis AX, and extend parallel to the axis AX, all having one same tilt with respect to the orthoradial direction relative to this axis.

The air situated in the proximity of the end face 24 is thus centrifuged by the fins 23 to be radially introduced in the outlet of the escape route 16. Complementarily, and to increase the effectiveness of this ventilation element 21, the fixed member 7 comprises, in the region of the outlet of the route 16, a circumferential edge 26 situated opposite the blades 23 of the element 21. Each fin 23 therefore extends between, on the one hand, the end face 24 of the rotating member 6 which carries it and, on the other hand, the edge 26 which itself is fixed, which enables to increase the effect of ventilation associated with all of the fins 23 by channelling the air flow which passes through them.

The ventilation element 21 thus enables to increase the pressure at the outlet of the escape route 16, to reduce, even annul, the pressure difference existing between the inlet and the outlet of the leak route 16. Thus, the air from the inner space 17, over-pressurised relative to the outside environment, does not pass through the leak route 16.

As indicated above, the seal according to the invention is advantageously manufactured with an additive manufacturing method, which enables to constitute parts which could have relatively complex shapes and which could also be slotted into one another.

In the present case, the rotating member which comprises an alternation of ridges and recesses, as well as the deoiling element and the ventilation element, overall has a relative complex shape, that it is advantageous to obtain through additive manufacturing, since it can thus be formed monobloc.

Moreover, the fact of manufacturing through additive manufacturing and, when appropriate, in one same operation, the rotating member together with the fixed member which surrounds it, further enables to even more reduce the radial gap existing between these two components, and through this, even increase the level of sealing conferred by the seal.

In the example of the figures, the outer face of the rotating member and the inner face of the fixed member are mainly cylindrical, but other shapes can also be considered, like, in particular, mainly conical shapes of revolution.

What is claimed is:

1. A contactless seal for a rotating shaft passing through an opening of a wall, the seal comprising a rotating member intended to be carried by the shaft and a fixed member intended to be carried by the opening of the wall, the rotating member being slotted into the fixed member while being mobile in rotation with respect to it, the rotating member having an outer face provided with at least one circumferential ridge and the fixed member having an inner face provided with at least one recess or vice versa, each ridge being partially engaged in a corresponding recess such that the inner face of the fixed member and the outer face of the rotating member jointly delimit a labyrinthine leak route, wherein the rotating member and the fixed member are each formed from one single part, wherein the rotating member and/or the fixed member is obtained by additive manufacturing, wherein the rotating member extends axially between first and second ends, wherein a deoiling element is provided at the first end and comprises a series of radial strips to centrifuge oil drops developing in a proximity thereof, wherein the radial strips extend outwards from the rotating member in a radial direction, and wherein a ventilation element is provided at the second end of the rotating member and is configured to introduce fluid into one of the ends of the labyrinthine leak route to reduce a pressure difference between the ends of the labyrinthine leak route, wherein the ventilation element comprises fins carried by an end face of the rotating member, and wherein the fins extend outwards from the end face in an axial direction.

2. The contactless seal according to claim 1, wherein the fixed member comprises an edge situated in regard to the fins of the ventilation element to channel ventilated air towards the labyrinthine leak route.

3. An aircraft engine equipped with an accessory power transmission, comprising the contactless seal according to claim 1.

4. The contactless seal according to claim 1, wherein the radial strips extend further outwards in the radial direction than the at least one circumferential ridge.

5. The contactless seal according to claim 1, wherein the deoiling element is located adjacent an axial end of the fixing member.

* * * * *